Nov. 29, 1966  M. GASTER  3,288,399
MEANS FOR CONTROLLING THE BOUNDARY LAYER OVER AN AEROFOIL BODY
Filed Oct. 15, 1965  2 Sheets-Sheet 1
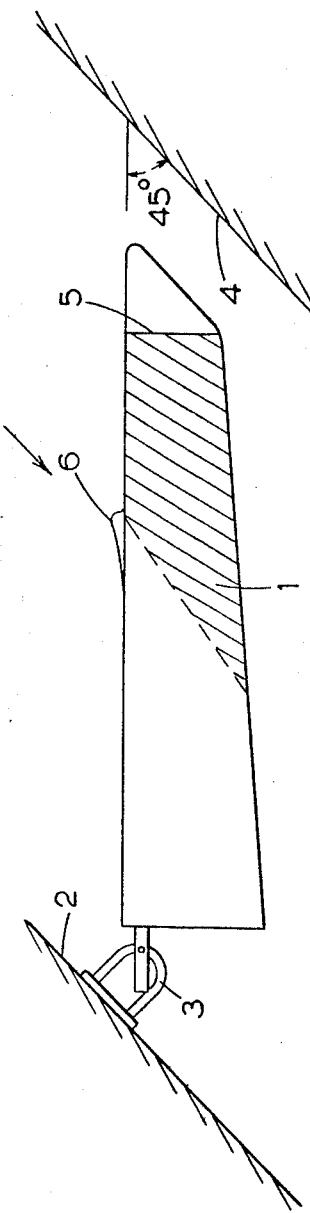
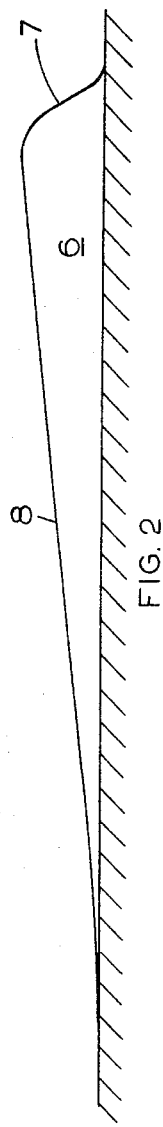
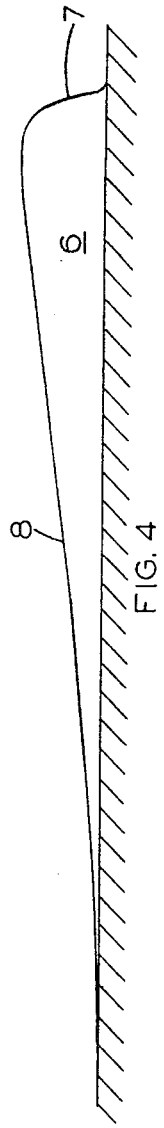
Inventor
Michael Gaster
By Stevens, Davis, Miller & Mosher
Attorneys Nov. 29, 1966  M. GASTER  3,288,399
MEANS FOR CONTROLLING THE BOUNDARY LAYER OVER AN AEROFOIL BODY
Filed Oct. 15, 1965   2 Sheets-Sheet 2

Inventor
Michael Gastner
By Stevens, Davis, Miller & Mosher
Attorneys

United States Patent Office 3,288,399
Patented Nov. 29, 1966

3,288,399
MEANS FOR CONTROLLING THE BOUNDARY
LAYER OVER AN AEROFOIL BODY
Michael Gaster, 12 St. James Mansion, West End Lane,
London, NW. 6, England
Filed Oct. 15, 1965, Ser. No. 496,389
Claims priority, application Great Britain, Dec. 16, 1964,
51,305/64
7 Claims. (Cl. 244—41)

The present invention relates to means for controlling the boundary layer over an aerofoil body.

It has been shown that where relative motion takes place between a fluid and an aerofoil body, as for example, the air flow over a wing of an aircraft in flight, the existence of viscous forces within the air gives rise to the adherence of air particles to the wing surface. A velocity gradient is therefore developed owing to the action of the viscous forces so that the relative motion between the aircraft wing and the air flow is effectively zero at the wing surface and equal to the free stream velocity at a small distance away from the wing surface. The region over which the velocity gradient is developed is known as the "boundary layer" and its existence is responsible for a significant portion of the drag force experienced by an aircraft in flight.

Boundary layer behaviour is related to Reynolds number, $R_o$, and it has been found that above a certain critical value of Reynolds number the character of the flow within the boundary layer undergoes a pronounced change. Below the critical Reynolds number the flow is characterised by an approximately linear increase in velocity from the wing surface to the free stream velocity; This condition is known as "laminar boundary layer flow." Above the critical Reynolds number this linear characteristic deteriorates and flow in the boundary layer becomes turbulent; this condition is known as "turbulent boundary layer flow."

According to the present invention, an aerofoil body having a swept leading edge containing an airflow attachment line is provided with means positioned along the leading edge to prevent spanwise propagation of a turbulent boundary layer along the attachment line, which means comprises a front and an associated inclined surface, which front is inclined steeply to the leading edge and which inclined surface blends smoothly into the leading edge, the front presenting a bluff surface to the turbulent boundary layer to create a transitional region of flow whereby a laminar boundary layer is established over the inclined surface and along the attachment line of the leading edge adjacent the inclined surface.

Preferably the means positioned along the leading edge to prevent spanwise propagation of a turbulent boundary layer along the attachment line is a shaped member secured to the leading edge.

The invention will now be described with reference to the accompanying diagrammatic drawings in which:

FIGURE 1 shows details of a wing model constructed for wing tunnel tests of a shaped member which prevents spanwise propagation of turbulent boundary layer in accordance with the invention;

FIGURE 2 shows an enlarged view of the general profile of the shaped member illustrated in FIGURE 1;

FIGURE 4 shows the general profile of a further shaped member in accordance with the invention.

Figure 3:
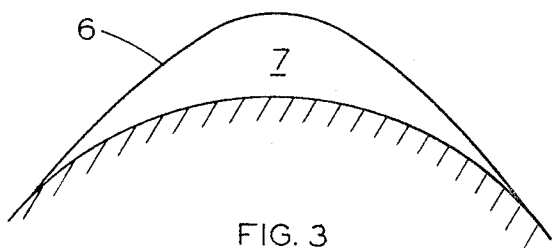
FIGURE 3 shows an end-view of the shaped member shown in FIGURE 2.

At a particular point on the leading edge of a swept back wing there is a speed at which the flow over the inboard section of the wing is turbulent and the flow over the outboard section is laminar. This phenomenon is caused by a disturbance, originating from a point on the flow attachment line (i.e. stagnation line) of the leading edge, propagating until it decays to laminar flow. It has been found that a turbulent boundary layer on the attachment line becomes laminar through the action of viscosity when the boundary layer Reynolds number $R_\theta$, is below a value of approximately 100, where $$R_\theta = \frac{\theta U}{V}$$

(based on the momentum thickness $\theta$, the kinematic viscosity $V$ at the attachment line and the free stream velocity $U$ along the leading edge). In the case of circular leading edges, $\theta$ can be calculated for laminar boundary flow and $R_\theta$ obtained from the following equation:

(1) $$R_\theta = 0.286 \frac{\sin \phi}{\sqrt{\cos \phi}} \sqrt{\frac{U \infty r}{V}}$$

where $r$ is the leading edge radius, $U$ the undisturbed free stream velocity, and $\phi$ the angle of sweep of the leading edge. It can thus be shown that contamination of the laminar boundary layer flow from turbulent boundary layer caused by a disturbance originating from a point on the attachment line will occur if $R_\theta$ is greater than 100. In an aircraft, such a disturbance is created by the intersection of a wing and the aircraft fuselage or by any discontinuity along the wing leading edge. Where $R_\theta$ is greater than 100, turbulent boundary layer flow at the wing fuselage intersection causes spanwise turbulent contamination of the flow along the leading edge of a swept wing and, subsequently, the flow over the complete wing surface becomes turbulent.

Low speed tunnel tests have been carried out on a model wing 1 of variable sweep mounted as shown in FIGURE 1. The wing 1 was attached to the wall 2 of the wind tunnel by means by a mounting bracket 3, and disposed such that the wing leading edge had an angle of sweep of 45° with the tip of the wing swept forward so that the wing leading edge was uncontaminated by any turbulent boundary layer flow from the tunnel wall 4. The state of the boundary layer was determined with the aid of a stethoscope coupled to a small surface total head tube. Initial tests with trip wires 5 located on the upstream tip of the wing creating disturbances on the attachment line of the wing leading edge, confirmed the criterion given by Equation 1 for the propagation of turbulent boundary layer flow contamination.

A means to prevent spanwise propagation of turbulent boundary layer flow in the form of a shaped member 6 was positioned on the wing leading edge as shown in FIGURE 1. The member is shown in enlarged scale in FIGURES 2 and 3.

In profile, the shaped member 6 comprises a front 7 and an associated inclined surface 8. The front 7 is inclined steeply to the wing leading edge and the inclined surface 8 blends smoothly into the leading edge outboard of the front. The front 7 presents a bluff surface to the turbulent boundary layer inboard of the front and the surface 8 is shaped so that there are no severe curves or changes in slope which could impose adverse pressure gradients in the flow over the inclined surface sufficient to cause turbulence within the flow. To obtain a smooth surface finish on the shaped member 6, the member was constructed from fibre-glass paste and secured and blended to the wing leading edge by commercial fillers.

The wind tunnel tests showed that the spanwise turbulent boundary layer flow created by the trip wires 5 did not propagate along the wing leading edge outboard of the steeply inclined front 7 and laminar boundary layer flow was established over the inclined surface 8 and along the wing leading edge outboard of the front 7.

It was found that the steeply inclined front 7 created a transitional region of flow from turbulent to laminar boundary layer flow for the turbulent boundary layer inboard of the steeply inclined front. Thus, a new uncontaminated boundary layer was formed which was laminar over the inclined surface 8 and the outboard portion of the wing. This phenomenon is illustrated in FIGURE 1 in which the turbulent boundary layer flow area is shown cross-hatched and the laminar boundary layer flow area left plain. It will be seen that the turbulent boundary layer flow along the attachment line of the wing is contained within a relatively small inboard portion of the wing adjacent the trip wires 5.

At angles of sweep above 45° and approaching 60°, it was found that a transitional region of flow was not created at the front 7 and thus the shaped member was ineffective in preventing spanwise turbulent boundary layer flow contamination. However, by steepening the inclination of the front 7, as shown in FIGURE 4, laminar flow was obtained up to a Reynolds number value of 170 with the wing at 60° sweep. It is thus evident that the inclination of the front depends upon the angle of sweep of the wing and the actual geometry of the leading edge, and that an optimum inclination for a given configuration of the shaped member can only be found by wind tunnel experiment.

Preferably, the angle of inclination of the front 7 to the wing leading edge should lie between 60° and 90°. However, it has been found that as the angle of inclination of the front 7 to the wing leading edge approaches 90°, so the number of wings of differing sweep angles to which the member can be applied increases. Likewise, it has been found that the angle of inclination of the surface 8 should, in practice, be as small as possible.

Figure 5:
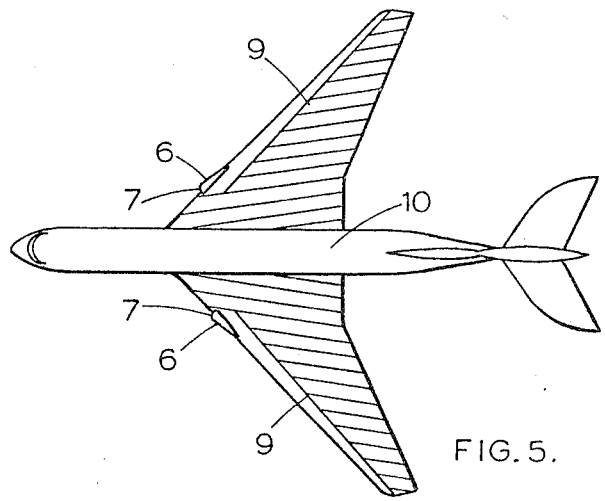
FIGURE 5 shows shaped members in accordance with the invention secured to the swept leading edges of aircraft wings.

In FIGURE 5 there is shown a shaped member secured to the swept leading edge of an aircraft wing. For the sake of clarity, the shaped member has been shown to a larger scale than would be necessary in practice. Spanwise turbulent flow contamination along the inboard sections of the leading edge originating from the turbulent boundary layer at the intersections of the wings 9 and fuselage 10 is prevented from extending over the outboard sections of the leading edges of the wings by the presence of the members 6. The turbulent flow, shown by cross-hatching, is contained within relatively small portions of the wing leading edges adjacent the aircraft fuselage. Laminar flow is established along the attachment line of the leading edge of the outboard wing sections and extends over the complete outboard section of the wing leading edge. In order to obtain the greatest possible area of laminar flow over the wing leading edge surfaces, the members 6 should be positioned close to the fuselage 10. This distance depends upon the thickness of the external turbulent flow originating from the turbulent boundary layer at the wing fuselage intersections and upon the height of the fronts 7. Preferably, the shaped members should be secured to the wing leading edges at positions where the external flow (i.e. non-boundary layer flow) is not turbulent. Care must be taken to avoid any roughness on the surface of the shaped members.

As will be seen from the figure, the members 6 establish laminar flow over the complete leading edge regions of the outboard sections of the wings, each region extending to a distance equivalent to approximately 15% of the wing chord. These regions of laminar flow may be extended by providing suction slots in the wing surface at the transition lines between laminar and turbulent flow.

As previously mentioned, turbulent contamination of the boundary flow may be created by any discontinuity along the wing leading edge. Thus, where a wing is, for example, provided with boundary layer fences, a means to prevent propagation of turbulent flow in accordance with the invention may be provided outboard of such fences.

I claim:

1. An aerofoil body having a swept leading edge containing an airflow attachment line along which contamination of laminar boundary layer flow is caused by turbulent boundary layer flow originating from a disturbance located at a point on or adjacent to the attachment line, means positioned along the leading edge and in the path of the turbulent boundary layer to prevent spanwise propagation of the turbulent boundary layer along the attachment line, which means is faired into the leading edge contour so as to present a smooth outline for the airflow over the aerofoil body and comprises a front facing the disturbance and an associated inclined surface, which front is inclined steeply to the leading edge and has a rounded portion which blends smoothly at one end into the inclined surface, the other end of the inclined surface blending smoothly into the leading edge, the front presenting a bluff surface to the turbulent boundary layer and being at such a distance from the disturbance that the height of the front is greater than the thickness of the turbulent boundary layer at the front so as to create a transitional region of flow whereby a laminar boundary layer is established along the inclined surface and the attachment line of the leading edge adjacent the inclined surface.

2. An aerofoil body as claimed in claim 1 in which the means positioned along the leading edge and in the path of the turbulent boundary layer to prevent spanwise propagation of the turbulent boundary layer along the attachment line is a shaped member having a smooth surface finish and faired into the leading edge contour of the aerofoil body.

3. An aerofoil body as claimed in claim 2 in which the shaped member has a front which subtends an angle of not greater than 90° to that part of the leading edge to which the shaped member is faired, the front presenting a bluff surface to the turbulent boundary layer and being at such a distance from the disturbance that the height of the front is greater than the thickness of the turbulent boundary layer at the front so as to create a transitional region of flow whereby a laminar boundary layer is established along the inclined surface and the attachment line of the leading edge adjacent the inclined surface.

4. An aircraft including a fuselage, an aerofoil body disposed on each side of the fuselage, each aerofoil body having a swept leading edge containing an airflow attachment line along which contamination of laminar boundary layer flow is caused by turbulent boundary layer flow originating from the intersection of the fuselage and the aerofoil body, means positioned along the leading edge of each aerofoil body and in the path of the turbulent boundary layer to prevent spanwise propagation of the turbulent boundary layer along the attachment line of the leading edge, each of which means is faired into the leading edge contour so as to present a smooth outline for the airflow over each aerofoil body and each means comprising a front facing the fuselage and an associated inclined surface, each front being inclined steeply to the leading edge and having a rounded portion which blends smoothly at one end into each inclined surface, the other end of each inclined surface blending smoothly into the leading edge, each front presenting a bluff surface to the turbulent boundary layer and being at such a distance from the intersection of the fuselage and the aerofoil body into which it is faired that the height of the front is greater than the thickness of the turbulent boundary layer at the front so as to create a transitional region of flow whereby laminar boundary layer is established along each inclined surface and the attachment line of the leading edge of each aerofoil body outboard of each front.

5. An aircraft as claimed in claim 4 in which the means positioned along the leading edge of each aerofoil body to prevent spanwise propagation of the turbulent boundary layer along the attachment line of each leading edge is a shaped member having a smooth surface finish and faired into the leading edge contour of each aerofoil body.

6. An aircraft as claimed in claim 5 in which the front of each shaped member subtends an angle of between 60° and 90° to that part of the leading edge to which the shaped member is faired.

7. An aircraft as claimed in claim 5 in which the front of each shaped member substends an angle of approximately 90° to that part of the leading edge to which the shaped member is faired.

References Cited by the Examiner

UNITED STATES PATENTS 2,802,630  8/1957  Birchill et al. -------- 244—91
2,885,161  5/1959  Kerker et al. ------ 244—91 X

OTHER REFERENCES

Jane's "All the World's Aircraft," 1960–1961, page 316.

MILTON BUCHLER, *Primary Examiner.*

T. MAJOR, *Assistant Examiner.*